US012372229B2

(12) United States Patent
Brown

(10) Patent No.: US 12,372,229 B2
(45) **Date of Patent: *Jul. 29, 2025**

(54) CONTAINER APPARATUS AND METHOD OF USING SAME

(71) Applicant: FUSE, LLC, Memphis, TN (US)

(72) Inventor: Matthew S. Brown, Falkner, MS (US)

(73) Assignee: FUSE, LLC, Memphis, TN (US)

( * ) Notice: Subject to any disclaimer, the term of this patent is extended or adjusted under 35 U.S.C. 154(b) by 275 days.

This patent is subject to a terminal disclaimer.

(21) Appl. No.: 17/703,257

(22) Filed: Mar. 24, 2022

(65) Prior Publication Data

US 2022/0214035 A1 Jul. 7, 2022

Related U.S. Application Data

(63) Continuation-in-part of application No. 17/126,419, filed on Dec. 18, 2020, now Pat. No. 11,293,634.

(60) Provisional application No. 62/949,858, filed on Dec. 18, 2019.

(51) Int. Cl.

| | |
|---|---|
| ***F21V 3/00*** | (2015.01) |
| ***A47G 19/22*** | (2006.01) |
| ***F21L 4/00*** | (2006.01) |
| ***F21V 17/16*** | (2006.01) |
| ***F21V 21/088*** | (2006.01) |
| ***F21V 33/00*** | (2006.01) |

(52) U.S. Cl.

CPC ...... *F21V 33/0036* (2013.01); *A47G 19/2227* (2013.01); *F21L 4/005* (2013.01); *F21V 17/16* (2013.01); *F21V 21/088* (2013.01); *A47G 2019/2238* (2013.01)

(58) Field of Classification Search

CPC ........ A47G 19/2227; A47G 2019/2238; F21L 4/005; F21V 17/16; F21V 21/088

See application file for complete search history.

(56) References Cited

U.S. PATENT DOCUMENTS

| | | | |
|---|---|---|---|
| 4,871,597 | A | 10/1989 | Hobson |
| 4,886,183 | A | 12/1989 | Fleming |
| 5,119,279 | A | 6/1992 | Makowsky |
| 5,178,450 | A | 1/1993 | Zelensky |
| 5,207,076 | A | 5/1993 | Sciarrillo |
| 5,415,305 | A | 5/1995 | Drake-Tipton et al. |
| 5,969,592 | A | 10/1999 | Reed |
| 6,092,905 | A | 7/2000 | Kochn |
| 6,158,870 | A | 12/2000 | Ramirez |
| 6,286,709 | B1 | 9/2001 | Hudson |
| 6,786,614 | B2 | 9/2004 | Ciarrocchi, Jr. |
| D516,875 | S | 3/2006 | Hicks et al. |
| 7,021,594 | B2 | 4/2006 | Exler |
| D533,751 | S | 12/2006 | Exler |
| D547,618 | S | 7/2007 | Exler |
| 7,922,031 | B1 | 4/2011 | Prince |
| 8,334,780 | B1 | 12/2012 | Mendoza, Jr. |
| 8,590,726 | B1 | 11/2013 | Mickelson et al. |

(Continued)

*Primary Examiner* — Thomas M Sember

(74) *Attorney, Agent, or Firm* — ASHLEY LAW FIRM P.C.; Stephen S. Ashley, Jr.

(57) ABSTRACT

A container apparatus can receive and hold a beverage container such as a beverage can or bottle. The apparatus can include a light assembly and can be used as a flashlight. A magnet can be positioned on the outer surface of the apparatus, and the apparatus can be magnetically attached to a metal support structure, such as a metal post or table.

19 Claims, 13 Drawing Sheets

(56) References Cited

U.S. PATENT DOCUMENTS

| | | | |
|---|---|---|---|
| 8,752,726 B2 | 6/2014 | Molz | |
| 8,844,316 B1 | 9/2014 | Ademola et al. | |
| 8,870,018 B2 | 10/2014 | Cook et al. | |
| 8,919,981 B2 | 12/2014 | Wang et al. | |
| 9,027,806 B1 * | 5/2015 | Gioggia | A45F 5/02 224/269 |
| 9,255,673 B2 | 2/2016 | Horn | |
| 9,568,186 B2 | 2/2017 | Brown | |
| 9,671,158 B1 | 6/2017 | Sandberg et al. | |
| 9,706,831 B2 | 7/2017 | Wu | |
| 9,975,675 B1 | 5/2018 | Kuo | |
| 10,827,863 B2 | 11/2020 | Brown et al. | |
| 10,874,233 B2 | 12/2020 | Santiago | |
| 11,383,903 B1 | 7/2022 | Gayle | |
| 2004/0136177 A1 | 7/2004 | Lewis et al. | |
| 2006/0196218 A1 | 9/2006 | Mogil | |
| 2008/0285621 A1 | 11/2008 | Rowen | |
| 2009/0175029 A1 | 7/2009 | Chiang | |
| 2012/0002400 A1 | 1/2012 | Lindholm | |
| 2012/0176782 A1 | 7/2012 | VanderShuit | |
| 2013/0168399 A1 | 7/2013 | Harrison-Griffin | |
| 2014/0204565 A1 | 7/2014 | Zwierstra | |
| 2014/0240962 A1 | 8/2014 | Wang et al. | |
| 2015/0069096 A1 * | 3/2015 | Kampas | A45F 5/00 224/148.6 |
| 2015/0077975 A1 | 3/2015 | Brown | |
| 2015/0182046 A1 | 7/2015 | Walsh | |
| 2015/0366383 A1 | 12/2015 | Raunio et al. | |
| 2016/0010845 A1 | 1/2016 | Brown | |
| 2018/0020814 A1 * | 1/2018 | Pasinski | A45F 3/02 224/148.4 |
| 2020/0100513 A1 | 4/2020 | Young | |
| 2020/0256547 A1 | 8/2020 | Brown | |
| 2021/0052097 A1 | 2/2021 | Brown et al. | |
| 2023/0055756 A1 | 2/2023 | Brown | |
| 2023/0200575 A1 | 6/2023 | Brown | |

* cited by examiner

CONTAINER APPARATUS AND METHOD OF USING SAME

CROSS REFERENCE TO RELATED APPLICATIONS

This application is a continuation-in-part of U.S. patent application Ser. No. 17/126,419, filed Dec. 18, 2020, which claims priority to U.S. Provisional Patent Application No. 62/949,858, filed Dec. 18, 2019. U.S. patent application Ser. Nos. 17/126,419 and 62/949,858 are incorporated by reference herein. In addition, U.S. Pat. No. 10,827,863, U.S. Patent Application Publication No. 2020/0256547, U.S. patent application Ser. No. 17/092,626, filed Nov. 9, 2020, and U.S. Provisional Patent Application No. 62/895,718, filed Sep. 4, 2019, are incorporated herein by reference.

TECHNICAL FIELD

The present invention relates to a beverage sleeve apparatus for use on a container, such as a beverage can or bottle. One embodiment of the invention comprises a container apparatus having a releasably attached magnetic member whereby the apparatus can be magnetically attached to a support structure, such as a metal post or table.

BACKGROUND

Insulating beverage container sleeves, known as “coozies”, “koozies” and/or “can huggies” are often used to hold beverage containers, such as beverage cans and bottles. The sleeves, made from an insulating material, help to maintain the beverage at the desired temperature for a longer period of time while also providing a comfortable means for the user to hold the beverage. The sleeve enables the user to hold the beverage without having to directly touch the beverage container itself, which may be very cold or hot.

SUMMARY

One object of the present invention is to provide a container apparatus for use on with a beverage container having means for releasably attaching the apparatus to a metal surface. Another object of the invention is to provide a beverage container apparatus that can also be used as a flashlight. These and other objects of the invention can be obtained in various embodiments of the invention described herein.

One embodiment of the invention comprises an apparatus adapted to hold a beverage container.

Another embodiment of the invention comprises a container apparatus that can hold a beverage container and can also be used as a flashlight.

Another embodiment of the invention comprises a container apparatus having a magnetic member and a light emitting device releasably attached to the container body.

Another embodiment of the invention comprises a container apparatus for use with a beverage container comprising means for releasable attachment to a cord, strap, rope or like member.

A container apparatus according to an embodiment of the invention comprises a container body adapted for receiving a beverage container, the container body having a top end defining an opening in the container body for receiving the beverage container and a base end opposite the top end. A magnetic member having magnetic properties can be positioned proximate the base end of the container body whereby the apparatus can be magnetically attached to a structure comprised of a magnetic material.

According to an embodiment of the invention, the magnetic member can be comprised of ceramic ferrite or samarium cobalt.

According to an embodiment of the invention, one or more flanges can be positioned on the outer surface of the container body. Each flange has an opening to receive and engage a complementary fastener.

According to an embodiment of the invention, the container apparatus includes a light assembly comprising a housing and at least one light emitting device contained within the housing. The light assembly housing can be releasably attached to the container body proximate the base end of the container. The housing can include a base panel, and the magnetic member can be attached to the outer surface of the base panel.

According to an embodiment of the invention, a recess is formed in the base panel and a fastening member is positioned within the recess. The fastening member is pivotably attached to the base panel, whereby the fastening member can be pivoted in and out of the recess.

According to an embodiment of the invention, the light emitting device can be a flexible printed circuit board, a light emitting diode, and/or an illuminated fiber optic cable.

According to an embodiment of the invention, the container body is comprised of transparent or translucent material.

According to an embodiment of the invention, the container body can be comprised of methyl methacrylate, thermoplastic polyurethane, and/or polymethylmethacrylate.

According to an embodiment of the invention, the container body is sized and shaped to receive the light assembly housing at the base end of the container body and frictionally engages the light assembly housing to releasably retain the light assembly housing within the container body.

According to an embodiment of the invention, the container body and the light assembly housing are substantially cylindrical.

According to an embodiment of the invention, the light assembly comprises a plurality of outer lights positioned proximate an outer edge of the light assembly housing whereby the outer lights illuminate the container body when activated.

According to an embodiment of the invention, the light assembly includes a center light positioned proximate a center of the light assembly housing and adapted to emit a beam of light whereby the apparatus can be used as a handheld flashlight when the center light is activated.

According to an embodiment of the invention, the container apparatus includes an on/off button positioned on an outer surface of the light assembly housing for turning the at least one light emitting device on and off. An opening can be formed in the container body for receiving the on/off button therethrough.

Another embodiment of the invention comprises a container apparatus comprising a container body adapted for receiving a beverage container comprising a sidewall comprising an upper sidewall section and a lower section. The upper sidewall section has a diameter larger than the lower sidewall section. The upper sidewall section has a top edge defining a top opening in the container body for receiving the beverage container and the lower sidewall section has a bottom edge defining a bottom opening in the container body. The container apparatus further comprises a light assembly comprising a housing and at least one light emitting device contained within the housing. The light assembly housing is sized and shaped to be received through the bottom opening of the container body, such that the outer surface of the light assembly housing frictionally engages the interior surface of the lower sidewall section and the light assembly housing is releasably retained within the container body.

According to an embodiment of the invention, a magnetic member having magnetic properties is positioned on the outer surface of the base of the light assembly housing. As such, the apparatus can be magnetically attached to a structure comprised of a magnetic material.

According to an embodiment of the invention, the light assembly includes a power source contained within the light assembly housing and operatively connected to the light emitting device(s) to power the light emitting device(s).

According to an embodiment of the invention, one or more flanges can be positioned on the outer surface of the upper sidewall section. Each flange has an opening to receive and engage a complementary fastener.

According to an embodiment of the invention, a recess is formed in the outer surface of the base of the light assembly housing and a fastening member is positioned within the recess. The fastening member is pivotably attached to the base, such that the fastening member can be pivoted in and out of the recess.

According to an embodiment of the invention, the upper sidewall section and the lower sidewall section of the container body are transparent or translucent.

According to an embodiment of the invention, the upper sidewall section, the lower sidewall section, and the light assembly housing are cylindrical. A plurality of outer lights can be positioned proximate the outer edge of the light assembly housing such that the outer lights illuminate the transparent/translucent container body when activated. A center light can be positioned proximate the center of the light assembly housing, and is adapted to emit a beam of light such that the apparatus can be used as a handheld flashlight when the center light is activated.

Another embodiment of the invention comprises a container apparatus comprising a container body adapted for receiving a beverage container therein. The container body has a top end defining an opening in the container body for receiving the beverage container, a base end opposite the top end, and at least one flange positioned on an outer surface of the container body having an opening formed therethrough to receive and engage a complementary fastener, such as a hook clasp. The apparatus can include a strap adapted for attachment with the complementary fastener. The beverage container can be a cup comprised of at least one food-grade material. According to a preferred embodiment, the cup is comprised solely of at least one food-grade material.

According to an embodiment of the invention, the cup is comprised of acrylonitrile butadiene styrene, high-density polyethylene, polyetheretherketone, acrylic, and/or polypropylene.

According to another embodiment of the invention, the flange(s) is positioned proximate the top end of the container body. The cup comprises a substantially cylindrical cup body having a top end defining an opening, and an upper lip section formed proximate the top end of the cup body. The upper lip section includes at least one projecting member extending outwardly from the cup body. The projecting member(s) rests on the flange(s) when the cup is positioned in the container body.

According to another embodiment of the invention, a base panel attached to the container body proximate the base end of the container body, wherein a recess is formed in the base panel and a fastening member is positioned within the recess, the fastening member pivotably attached to the base panel whereby the fastening member can be pivoted in and out of the recess. A magnetic member can be positioned on the outer surface of the base panel. The magnetic member is comprised of a material having magnetic properties whereby the apparatus can be magnetically attached to a structure comprised of a magnetic material.

According to another embodiment of the invention, the apparatus can include a light assembly comprising a housing and at least one light emitting device contained within the housing, the housing releasably attached to the container body proximate the base end of the container body. The housing includes a base panel and a recess is formed in the base panel. A fastening member can be positioned within the recess and pivotably attached to the base panel, whereby the fastening member can be pivoted in and out of the recess.

According to an embodiment of the invention, the light emitting device can be a flexible printed circuit board, a light emitting diode, and/or an illuminated fiber optic cable. The container body can be comprised of methyl methacrylate, thermoplastic polyurethane, and/or polymethylmethacrylate.

According to an embodiment of the invention, the container body is sized and shaped to receive the light assembly housing at the base end of the container body and frictionally engages the light assembly housing to releasably retain the light assembly housing within the container body.

According to another embodiment of the invention, the container body can be comprised of a transparent or translucent material, the container body and the light assembly housing can be substantially cylindrical, and a plurality of outer lights can be positioned proximate an outer edge of the light assembly housing whereby the outer lights illuminate the container body when activated.

According to another embodiment of the invention, the container body can be comprised of a transparent or translucent material, the container body and the light assembly housing can be substantially cylindrical, and a center light can be positioned proximate a center of the light assembly housing and adapted to emit a beam of light whereby the apparatus can be used as a handheld flashlight when the center light is activated.

Another embodiment of the invention comprises a container apparatus comprising a container body and a light assembly. The container body is adapted for receiving a beverage container. The container body comprises a sidewall comprising an upper sidewall section and a lower sidewall section. The upper sidewall section has a diameter larger than the lower sidewall section. The upper sidewall section has a top edge defining a top opening in the container body for receiving the beverage container and the lower sidewall section has a bottom edge defining a bottom opening in the container body. The light assembly comprises a housing and at least one light emitting device contained within the housing. The light assembly housing is sized and shaped to be received through the bottom opening of the container body, wherein an outer surface of the light assembly housing frictionally engages an interior surface of the lower sidewall section whereby the light assembly housing is releasably retained within the container body. A recess can be formed in the light assembly housing and a fastening member is positioned within the recess and pivotably attached to the base, whereby the fastening member can be pivoted in and out of the recess. A flange can be positioned on an outer surface of the upper sidewall section. The flange can have an opening to receive and engage a complementary fastener.

According to an embodiment of the invention, the container body can be comprised of a transparent or translucent material. The upper sidewall section, the lower sidewall section, and the light assembly housing can be substantially cylindrical. The light emitting device can comprise a plurality of outer lights positioned proximate an outer edge of the light assembly housing whereby the outer lights illuminate the container body when activated, and a center light positioned proximate a center of the light assembly housing and adapted to emit a beam of light whereby the apparatus can be used as a handheld flashlight when the center light is activated.

Another embodiment of the invention comprises a container apparatus comprising a container body adapted for receiving a beverage container. The container body has a top end defining an opening in the container body for receiving the beverage container and a base end opposite the top end. A first flange is positioned on the outer surface of the container body and has an opening formed therethrough to receive and releasably engage a first fastener. A second flange is positioned on the outer surface of the container body and has an opening formed therethrough to receive and releasably engage a second fastener. The apparatus can include a strap having a first fastener attached to one end of the strap and a second fastener attached to the opposite end of the strap. The strap is connected to the container body by positioning the first fastener in the opening formed in the first flange and positioning the second fastener in the opening formed in the second flange. According to an embodiment, the apparatus can further include a light assembly releasably attached to the container body. The light assembly comprises a housing and at least one light emitting device contained within the housing. A recess can be formed in the housing, and a hanger clip can be positioned within the recess and pivotably attached to the housing whereby the hanger clip can be pivoted in and out of the recess.

Another embodiment of the invention comprises a kit comprising a container apparatus and a cup apparatus positionable within the container apparatus. The container apparatus can comprise a substantially cylindrical container body having a top end defining an opening in the container body and a base end opposite the top end. A first flange can be positioned on an outer surface of the container body and can have an opening formed therethrough to receive and releasably engage a first fastener. A second flange can be positioned on the outer surface of the container body and can have an opening formed therethrough to receive and releasably engage a second fastener. The cup apparatus can comprise a substantially cylindrical cup body having a top end defining an opening, and an upper lip section formed proximate the top end of the cup body. The upper lip section includes a first projecting member and a second projecting member extending outwardly from the cup body. The first projecting member rests on the first flange and the second projecting member rests on the second flange when the cup is positioned in the container body.

According to an embodiment of the invention, the kit can further include a strap having a first fastener attached at one of the strap and a second fastener attached at the opposite end of the strap. The strap can be attached to the container body by positioning the first fastener in the opening formed in the first flange and positioning the second fastener in the opening formed in the second flange.

DETAILED DESCRIPTION OF PREFERRED EMBODIMENTS

Figure 1:
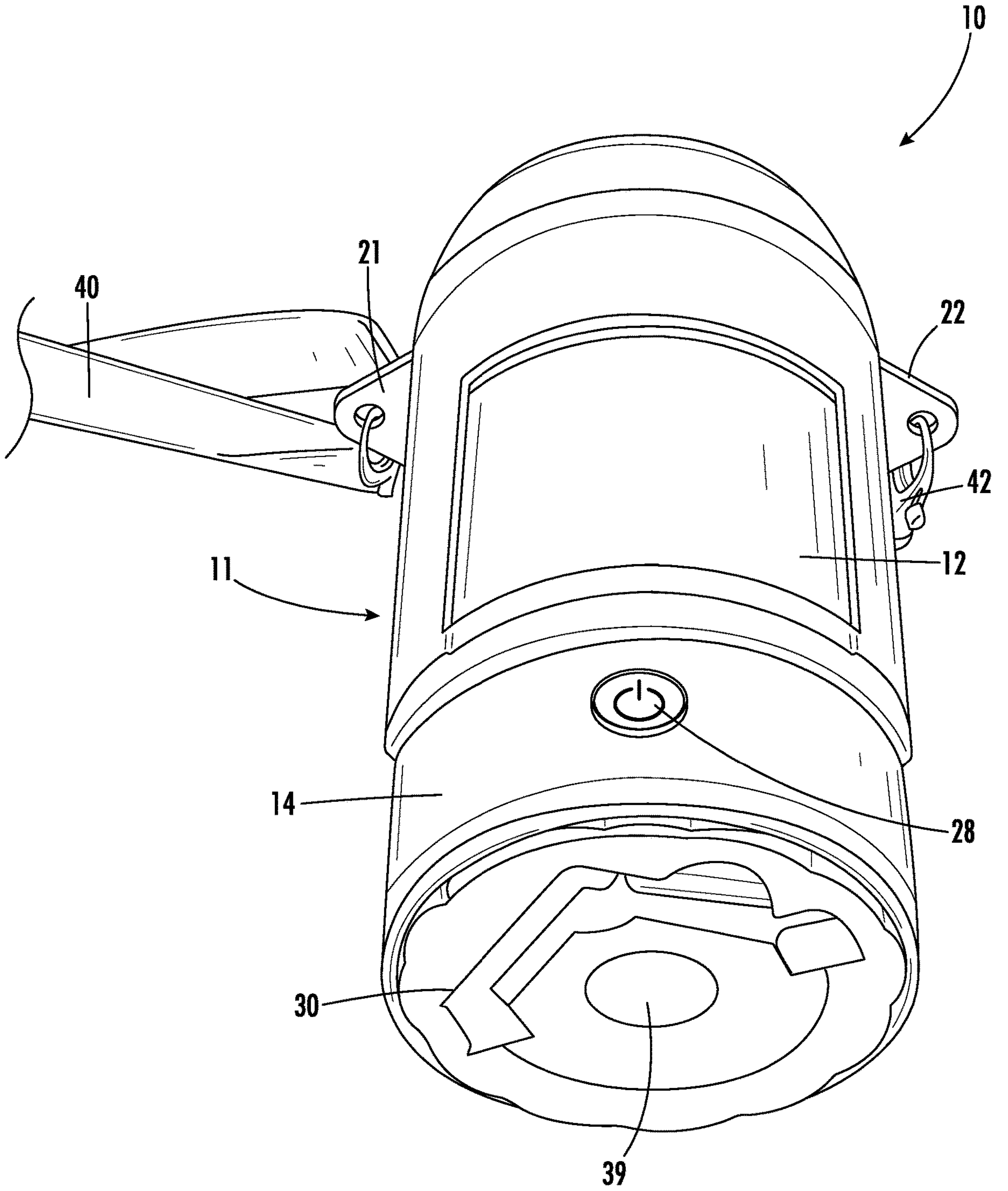
FIG. 1 is a perspective view of a container apparatus according to an embodiment of the invention.

A beverage container apparatus according to a preferred embodiment of the invention is illustrated in FIGS. 1-13 and shown generally at reference numeral 10. The container apparatus 10 comprises a substantially cylindrical body 11, and a light assembly 30 positioned at the base of the cylindrical body 11.

Figure 7:
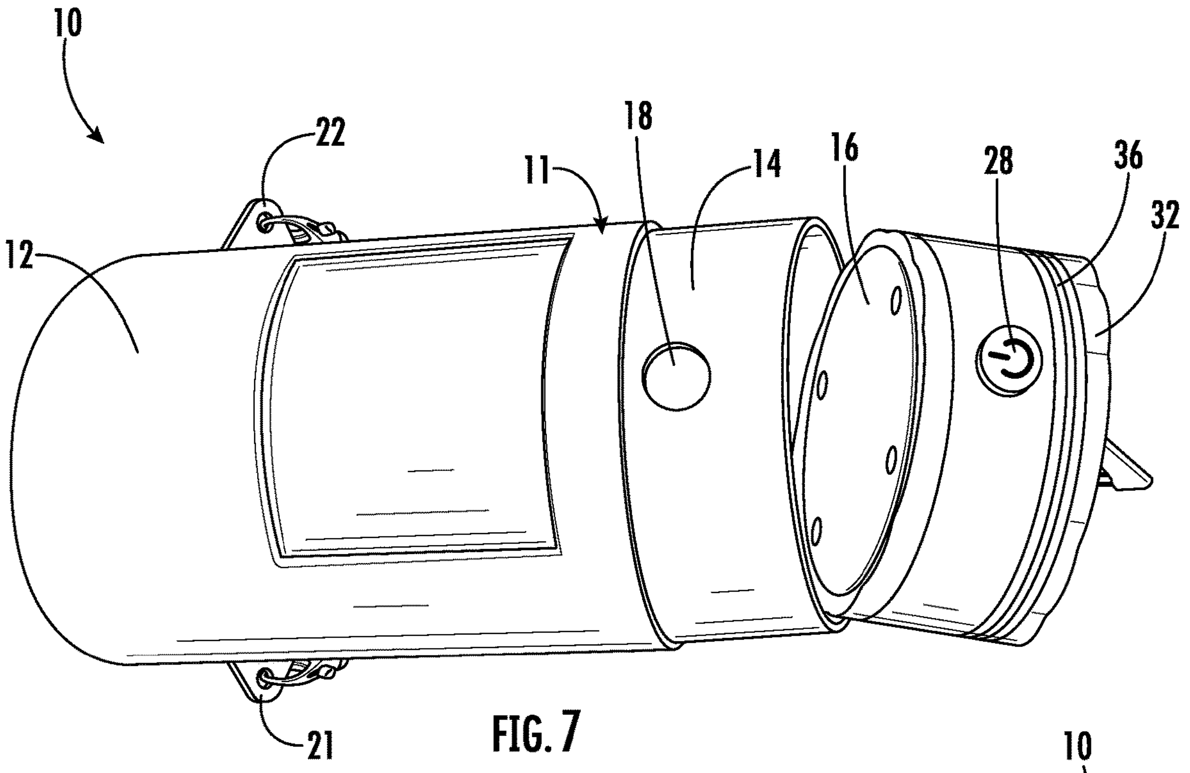
FIG. 7 is another perspective view of the apparatus of FIG. 1.
Figure 8:
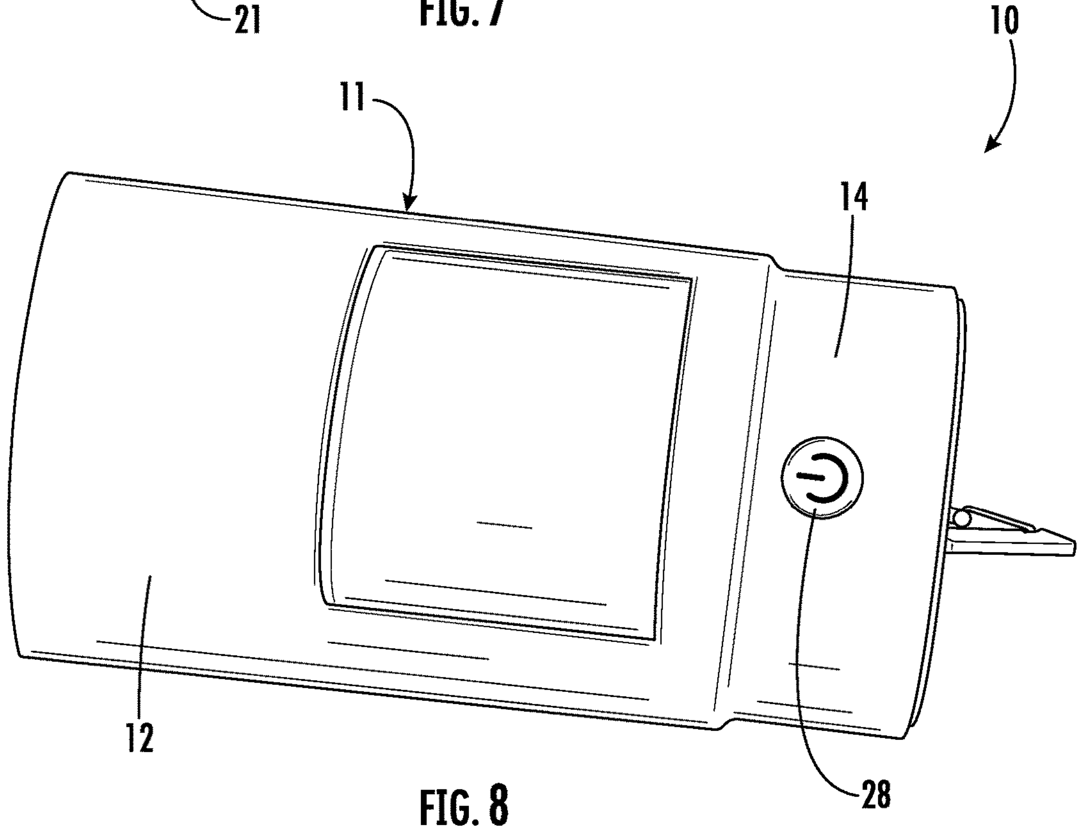
FIG. 8 is another perspective view of the apparatus of FIG. 1.

The cylindrical body 11 can comprise an upper cylindrical sidewall 12, and a lower cylindrical sidewall 14. As shown in FIGS. 1, 7 and 8, the diameter of the lower sidewall 14 is less than the diameter of the upper sidewall 12. When positioned upright, as shown in FIG. 1, the upper sidewall 12 extends upwardly from the lower sidewall 14. The upper sidewall 12 has a top edge 13, shown in FIG. 2, defining a circular opening at the top, which can be sized to receive a conventional beverage bottle or can therethrough.

Preferably, the container body 11 is comprised of a resilient material that is transparent or translucent, such as methyl methacrylate (MMA), thermoplastic polyurethane (TPU) or polymethylmethacrylate (PMMA).

Figure 2:
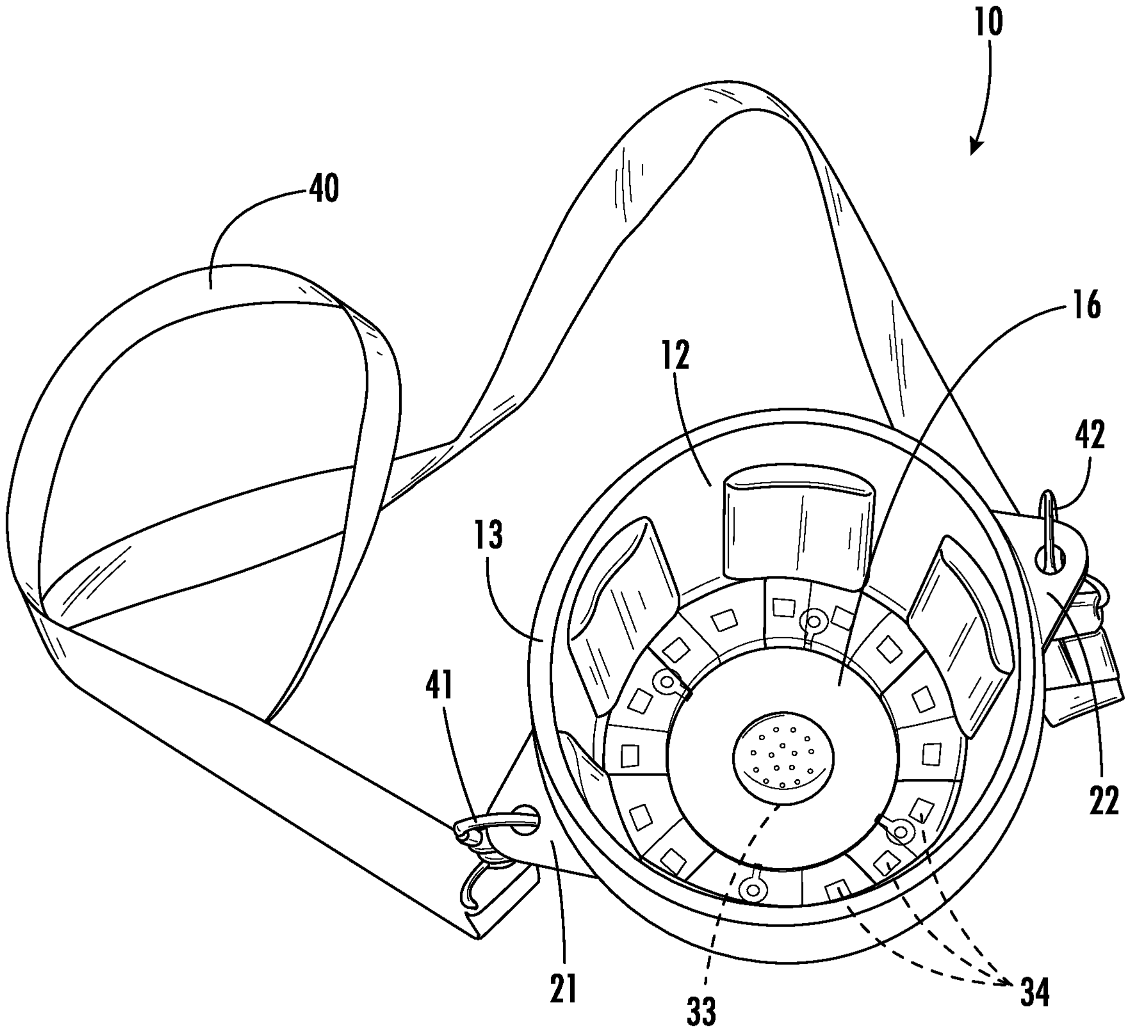
FIG. 2 is a top plan view of the apparatus of FIG. 1.

A pair of flange sections 21, 22 can extend outwardly from the outer surface of the upper sidewall 12, as shown in FIGS. 1 and 2. Each flange section 21, 22 has an opening therethrough to receive a connecting member therethrough. As shown in FIG. 2, the connecting member can be a strap 40 with fasteners such as hook clasps 41, 42 attached at opposite ends of the strap 40. Alternatively, the fasteners can be bolt snaps. The clasps 41, 42 are positioned through the openings formed in the flange sections 21, 22, respectively, as shown in FIG. 2.

Figure 3:
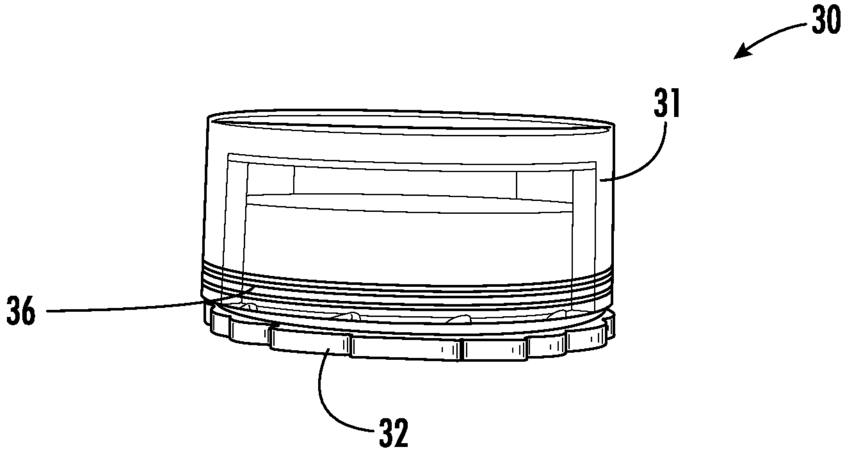
FIG. 3 is a perspective view of the light assembly of the apparatus of FIG. 1.
Figure 4:
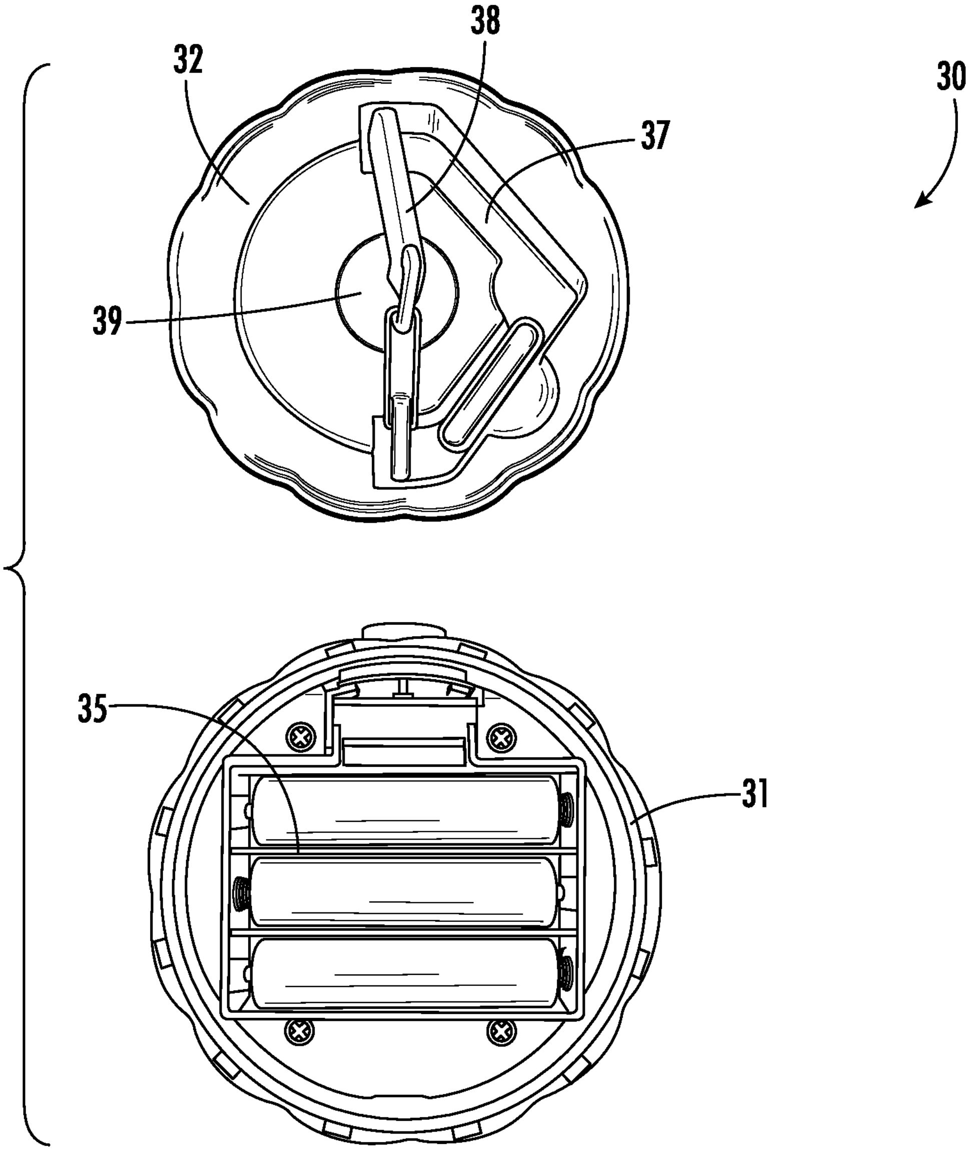
FIG. 4 is an exploded perspective view of the light assembly of FIG. 3.
Figure 5:
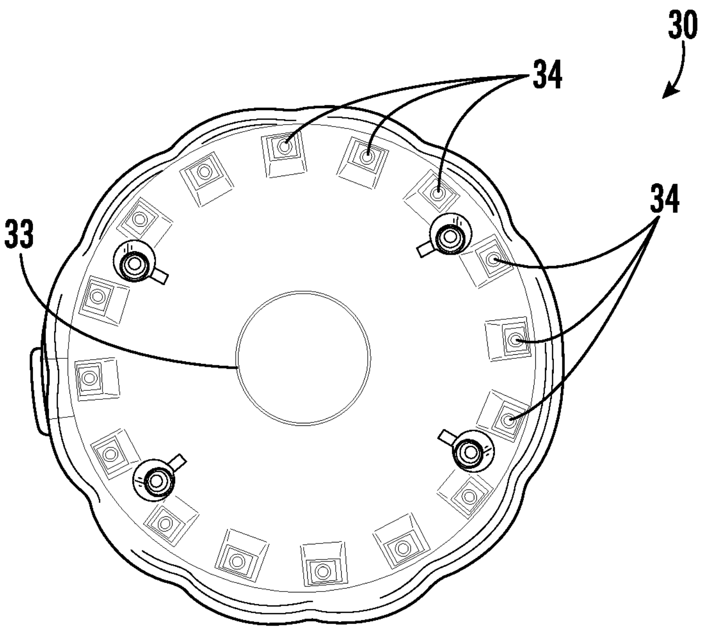
FIG. 5 is a top view of the light assembly of FIG. 3.
Figure 6:
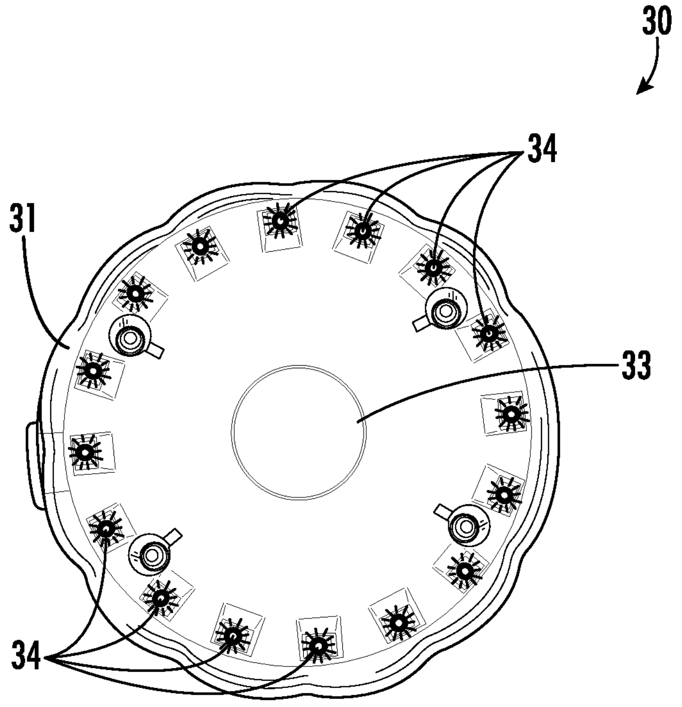
FIG. 6 is another light assembly of FIG. 3.

As shown in FIGS. 3 and 4, the light assembly 30 comprises a cylindrical body 31 releasably attached to a circular base panel 32. As shown in FIGS. 5 and 6, a plurality of outer lights 34 can be positioned proximate the outer edge of the upper surface of the light assembly 30. Preferably, the outer lights 34 are multi-colored light emitting diodes (LED). A center light 33 can be positioned proximate the center of the upper surface of the light assembly 30, a shown in FIGS. 5 and 6. The light assembly 30 contains a power source operatively connected to the center light 33 and outer lights 34 to power the lights 33, 34. The power source can be one or more batteries, such as three AA sized batteries 35, as shown in FIG. 4. As shown in FIG. 3, threads 36 can be formed on a portion of the outer surface of the body 31 that engage in complementary fashion with threads formed on an inner surface of the base panel 32, such that the base panel 32 can be screwed on and off of the light assembly body 31. The base panel 32 can be screwed off the body 31 to expose the interior of the body 31 to replace batteries as needed, as shown in FIG. 4.

A top panel 16 can be attached to the light assembly 30 opposite the base panel 32, as shown in FIG. 7. The top panel 16 is comprised of a transparent or translucent material. When the light assembly is positioned within the container body 11, the top panel 16 is positioned between the upper sidewall 12 and the lower sidewall 14 and can serve as a floor wall that can support a bottle, can or other beverage container positioned within the apparatus 10. When positioned upright, the upper sidewall 12 extends upwardly from the panel 16 and the lower sidewall 14 extends downwardly from the panel. In an alternative embodiment, the panel 16 can be integrally formed as part of the container body 11, rather than attached to the light assembly 30.

As shown in FIGS. 1, 7 and 8, the light assembly 30 is positioned within the lower side wall 14 and against the floor wall 16 of the container body 11, with the lights 33, 34 adjacent the floor wall 16. The light assembly 30 can be sized and shaped such that it is held within the container body 11 by frictional engagement between the light assembly body 31 and the inner surface of the lower sidewall 14.

Figure 9:
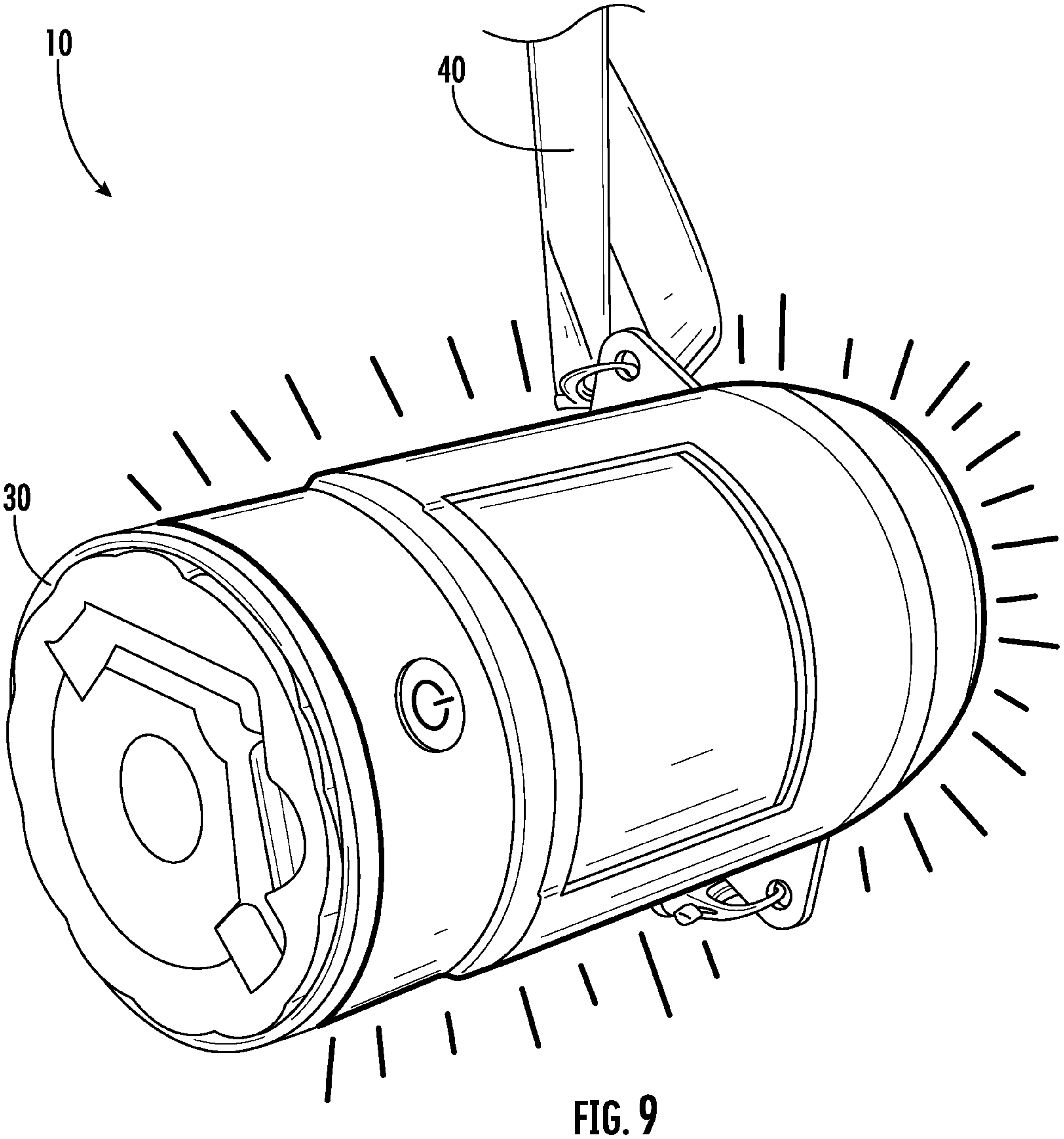
FIG. 9 is another perspective view of the apparatus of FIG. 1.

When the outer lights 34 are activated, shown in FIG. 6, the outer lights 34 transmit light throughout the transparent/translucent body 11, lighting up the container body 11, as shown in FIG. 9. When the center light 33 is activated, a beam of white light emanates from the apparatus 10, and the apparatus 10 can be used as a handheld flashlight.

The light assembly 30 includes means for turning the lights 32, 33 on and off. The light assembly can include an on/off button 28 on the outer surface of the light assembly body 31, as shown in FIGS. 1, 7 and 8. An opening 18 can be formed in the lower sidewall 14 of the container body 11, and the on/off button 28 can be positioned through the opening 18, as shown in FIGS. 7 and 8. The light assembly 30 can be programmed such that pressing the on/off button 28 sequentially activates and/or deactivates the various functions of the lights 33, 34. For example, pressing the button 28 once can activate the outer lights 34. Pressing the button 28 a second time can deactivate the outer lights 34 and activate the center light 33. Pressing the button 28 a third time can outer lights 34, so both the outer lights 34 and the center light 34 are on. Pressing the button 28 a fourth time can deactivate both the outer lights 34 and the center light 33.

Figure 10:
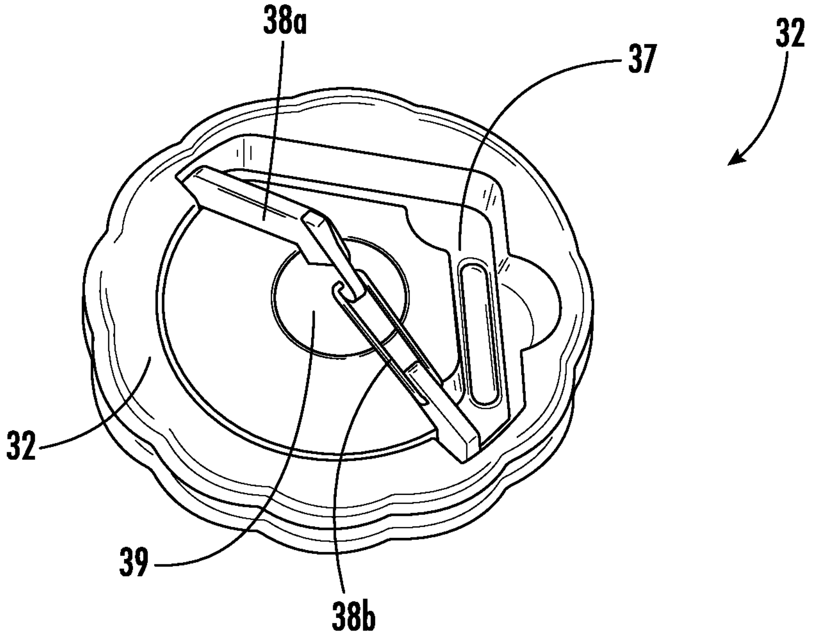
FIG. 10 is a partial perspective view of the light assembly of FIG. 3.
Figure 11:
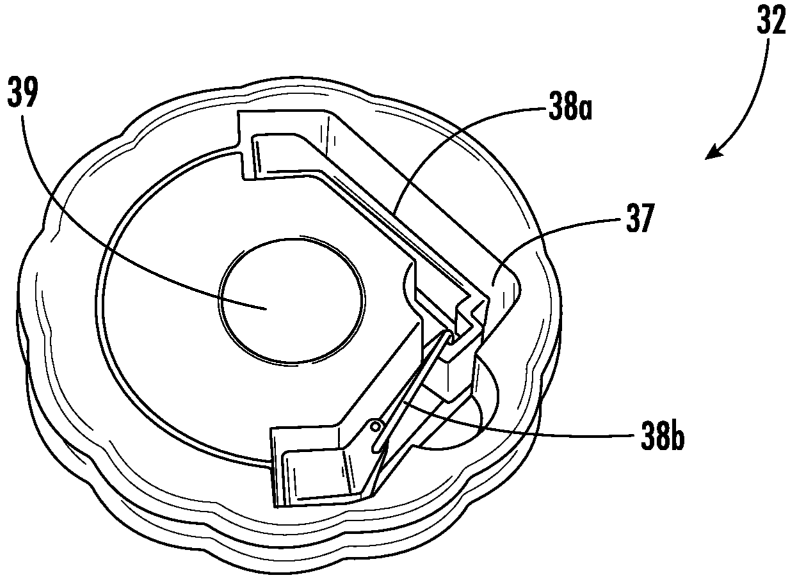
FIG. 11 is another partial perspective view of the light assembly of FIG. 3.
Figure 12:
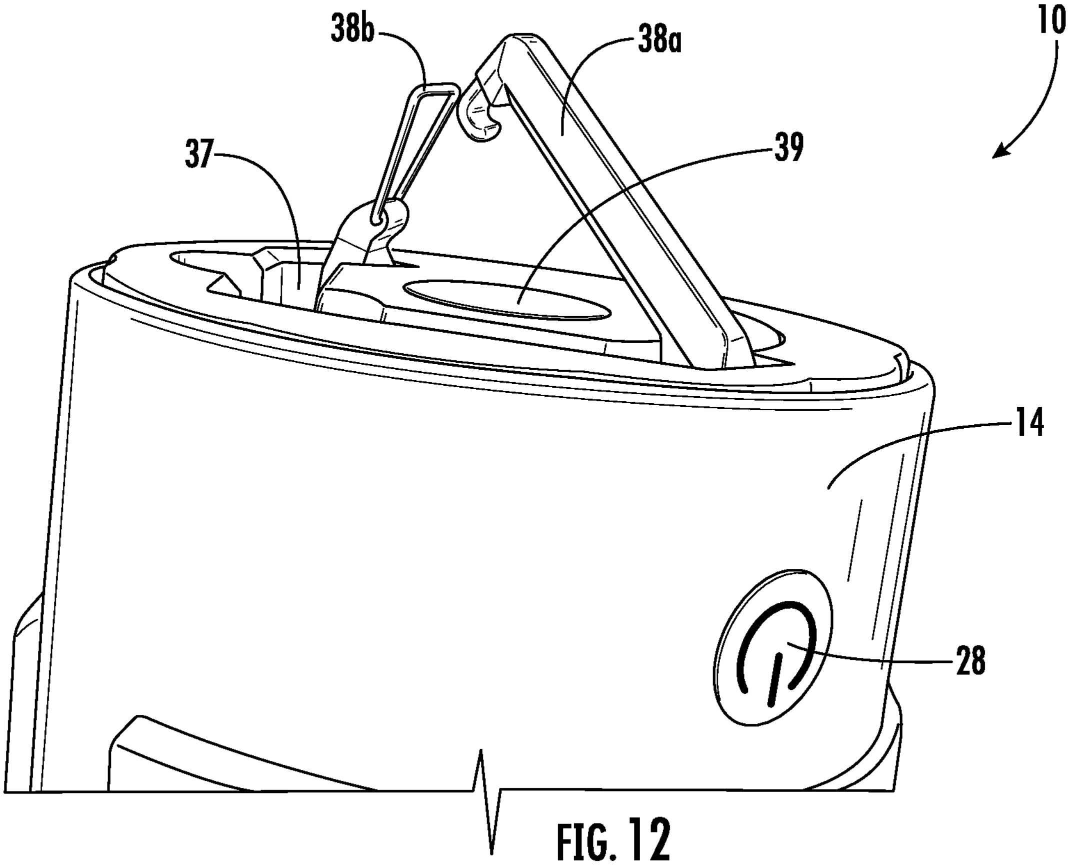
FIG. 12 is a partial perspective view of the apparatus of FIG. 1.
Figure 13:
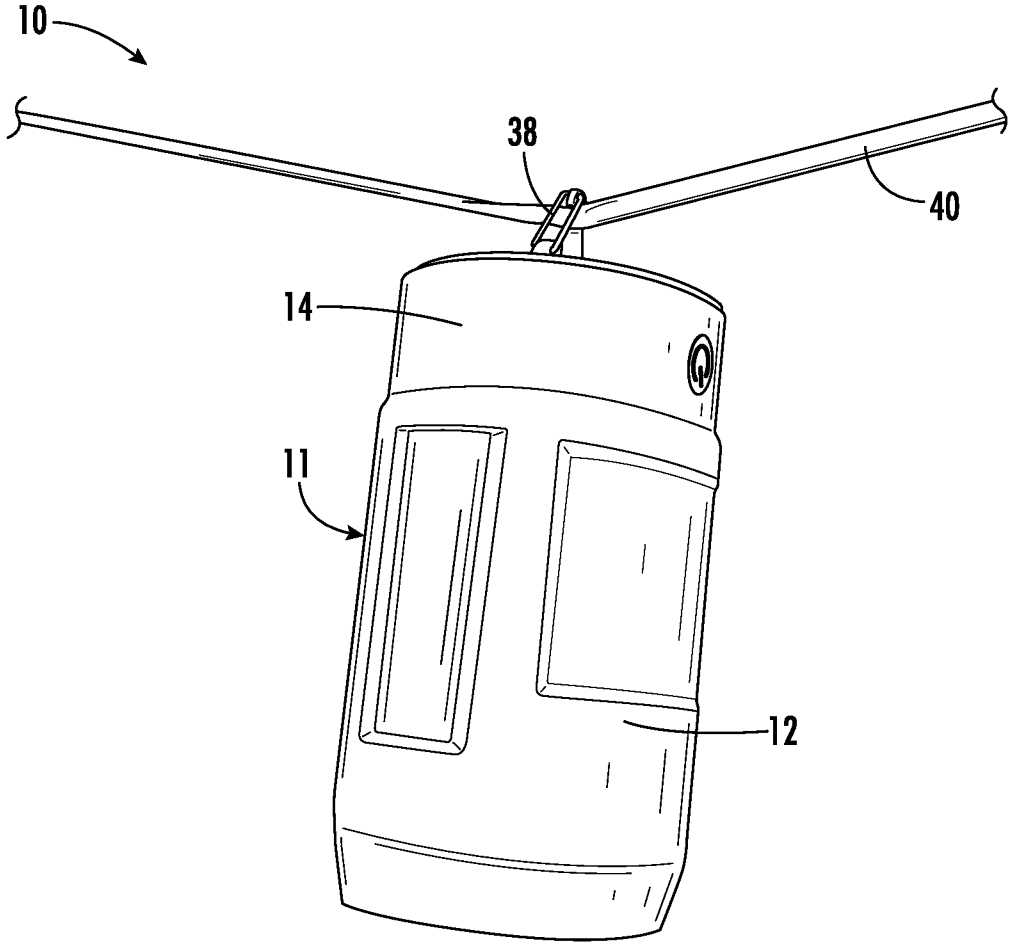
FIG. 13 is an environmental perspective view of the apparatus of FIG. 1.

The apparatus 10 can include means for hanging the apparatus on a rope, cable, cord, string or other like connecting member. A recess 37 can be formed in the bottom surface of the base panel 32, and a fastening member such as a hanger clip 38 is positioned within the recess 37, as shown in FIGS. 10 and 11. The hanger clip 38 can be comprised of a hook member 38*a* that can be releasably attached to a loop member 38*b*, as shown in FIGS. 10-12. The hook member 38*a* and loop member 38*b* are each pivotably attached to the base panel 32. The hook member 38*a* and loop member 38*b* can be pivoted outwardly from the base panel 32, as shown in FIGS. 10 and 12. The strap 40 can be detached from the flange sections 21, 22, and positioned under the hanger clip 38 so the apparatus 10 hangs from the cord 40, as shown in FIG. 13.

Figure 14:
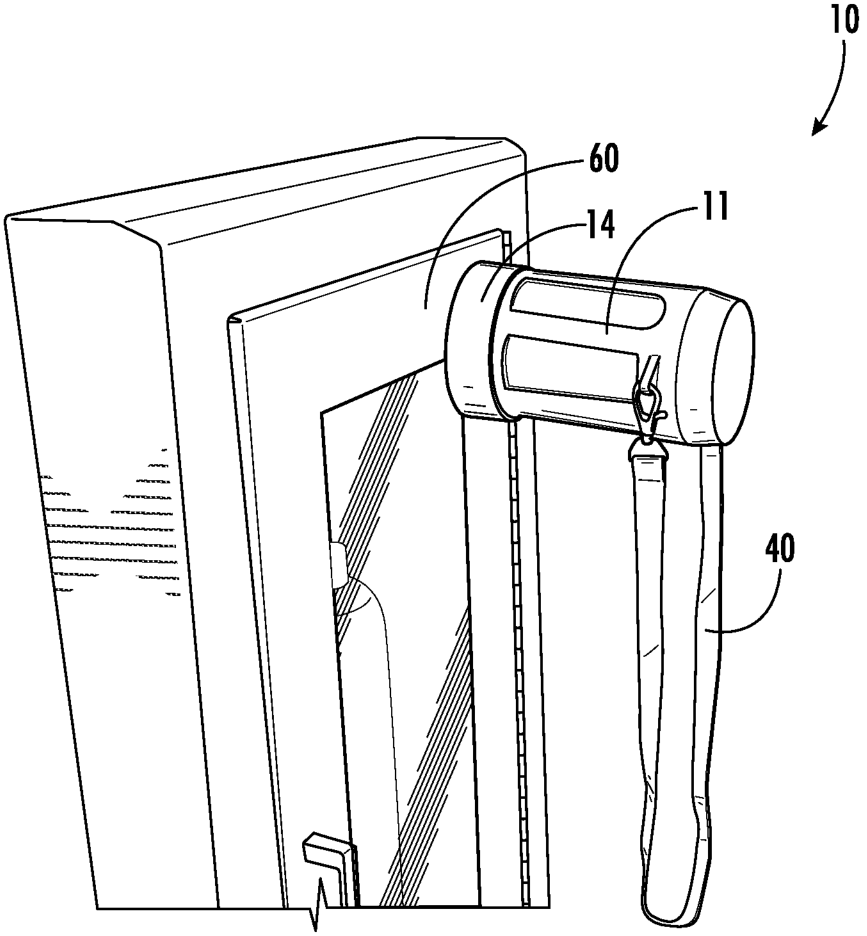
FIG. 14 is another environmental perspective view of the apparatus of FIG. 1.
Figure 15:
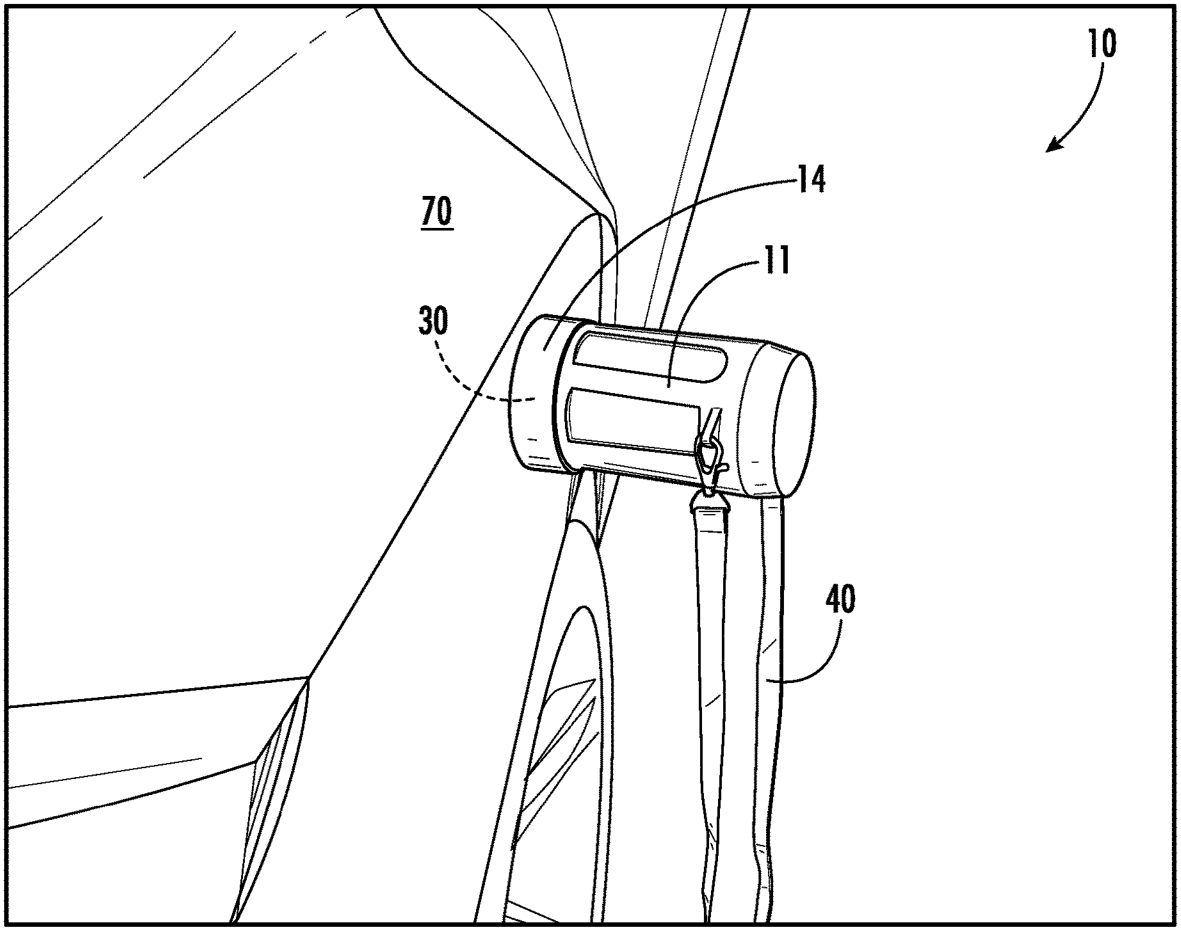
FIG. 15 is another environmental perspective view of the apparatus of FIG. 1.

The base panel 32 can include a magnetic member 39 positioned at the center of the outer surface of the base panel 32, as shown in FIGS. 1 and 11. The magnetic member 39 is comprised of a material having magnetic properties. The magnetic member 39 can be comprised of ceramic ferrite, samarium cobalt or other suitable magnetic material. As such, the container apparatus 10 can be magnetically attached to a support structure made of a material that is attracted to magnets. For example, the apparatus 10 can be magnetically attached to the surface of a metal case 60, as shown in FIG. 14. In another example, the apparatus 10 can be magnetically attached to the body of an automobile 70, as shown in FIG. 15.

Figure 16:
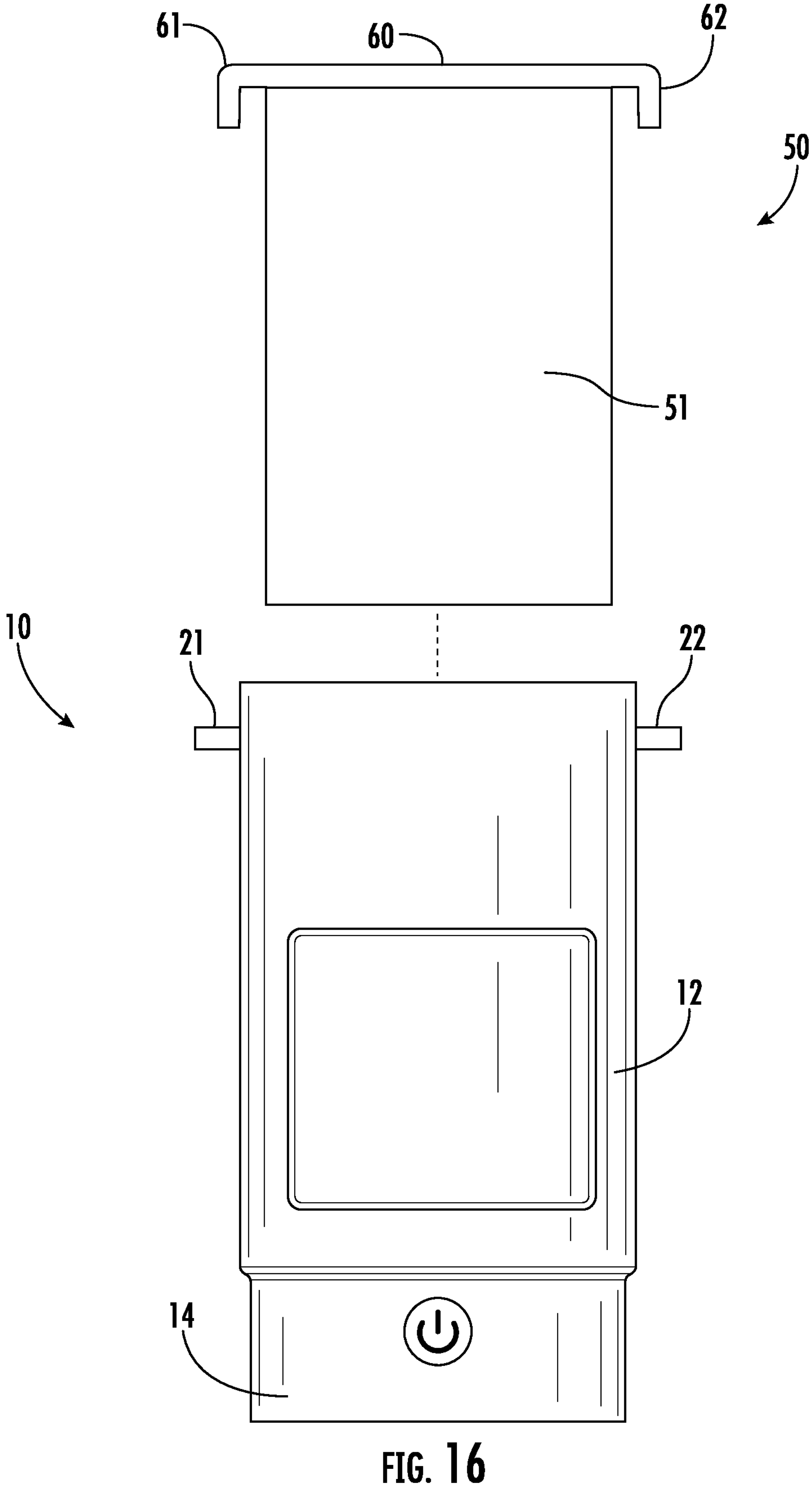
FIG. 16 is an exploded front elevation of a container apparatus according to another embodiment of the invention.
Figure 17:
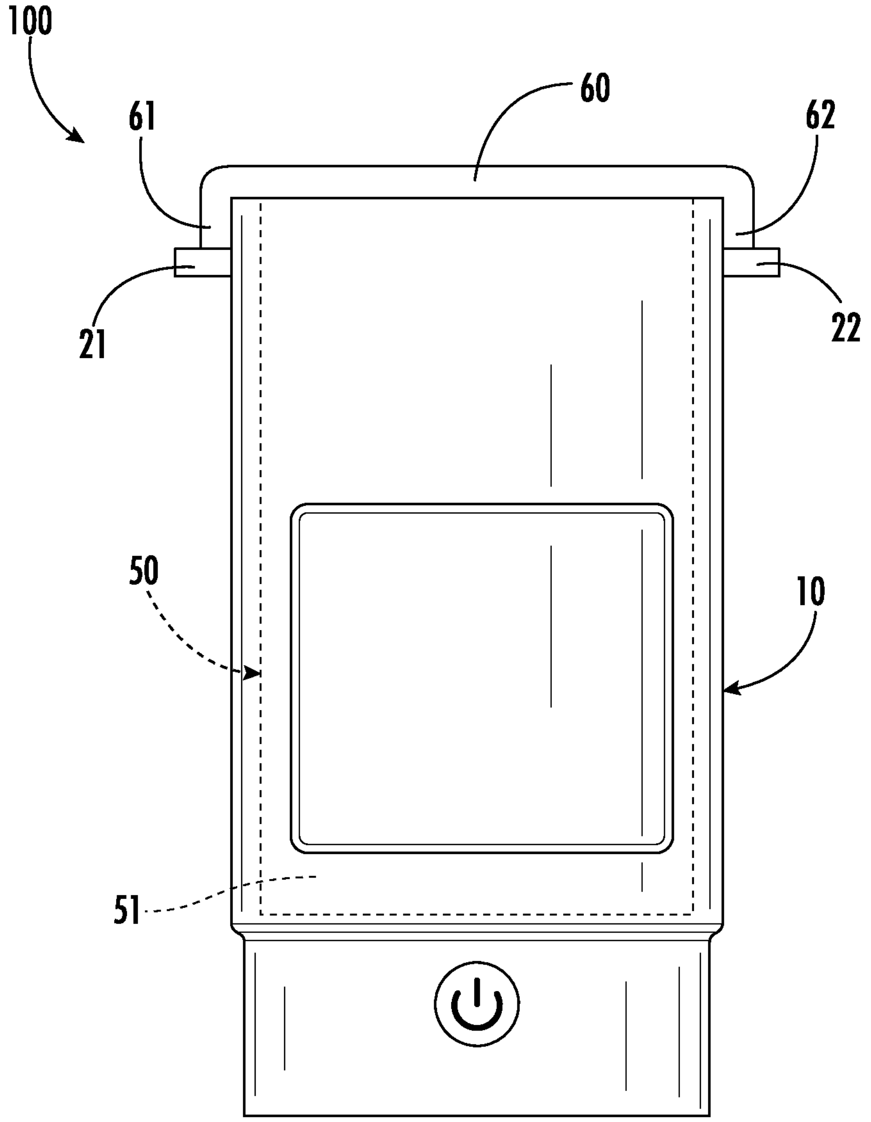
FIG. 17 is another front elevation of the container apparatus of FIG. 17.

FIGS. 16 and 17 illustrate another embodiment of the invention, shown generally at reference numeral 100, that comprises the container apparatus 10 and a cup apparatus 50 positionable within the container apparatus 10. The cup apparatus 50 comprises a substantially cylindrical cup body 51 comprising a base 56 and a cylindrical sidewall 52 extending upwardly from the base 56. The cup body 51 has a top end opposite the base 56 that defines an opening for receiving a liquid beverage therethrough. The cup body 51 and the container body 11 are shaped and sized such that the outer surface of the cup sidewall 52 frictionally engages the inner surface of the upper sidewall 12 of the container 10 when the cup 50 is positioned within the container 10, as shown in FIG. 17, whereby the cup 50 is releasably retained within container apparatus 10.

The cup 50 can include an upper lip section 60 formed proximate the top end of the cup body 51. The upper lip section 60 extends outwardly from the cup body 51 and covers the top edge 13 of the upper sidewall 12 of the container apparatus 10 when the cup 50 is positioned in the container apparatus 10, as shown in FIG. 17. The upper lip section 60 includes a first and second projecting members 61, 62 extending outwardly from the cup body 51, as shown in FIG. 16. The projecting members 61, 62 are positioned approximately one hundred eighty degrees from each other. The projecting members 61, 62 are angled, extending outwardly and downwardly at approximately ninety degree angles, as shown in FIG. 16. The cup 50 is inserted with the base 56 first through the top opening of the container apparatus 10 defined by the top edge 13 of the upper sidewall 12, as shown in FIG. 16. The cup 50 is inserted into the container 10 until the base 56 of the cup 50 is proximate the floor panel 16 of the container 10, as shown in FIG. 17. When so positioned, the first projecting member 61 rests on the first flange 21 of the container apparatus 10, and the second projecting member 62 rests on the second flange 22 of the container apparatus 10, as shown in FIG. 17. This helps to releasably retain the cup 50 within the container 10.

According to a preferred embodiment, the cup 50 is comprised solely of one or more food-grade materials. As used herein, "food-grade materials" refers to materials that can be in direct contact with food and beverages intended for human consumption without causing harm to a person consuming the food and/or beverages. Food-grade materials include materials listed by the U.S. Food and Drug Administration as Food Contact Substances. For example, food-grade materials include acrylonitrile butadiene styrene (ABS), high-density polyethylene (HDPE), polyetheretherketone (PEEK), acrylic (PMMA), and polypropylene (PP). A user can position the cup 50 within the container 10, as shown in FIG. 17, and pour a liquid beverage into the cup 50. As noted above, the upper lip section 60 extends outwardly from the cup body 51 and covers the top edge 13 of the upper sidewall 12 of the container apparatus 10 when the cup 50 is positioned in the container apparatus 10. As such, the user's lips contact the lip section 60 of the cup 50—not the top edge 13 of the container 10—when taking a sip of the beverage in the cup 50. After the user has consumed the beverage, the cup 50 can be removed from the container apparatus 10 by grasping the upper lip section 60 pulling the cup 50 out of the container apparatus 10.

A container apparatus and method of using same are described above. Various changes can be made to the invention without departing from its scope. The above description of the preferred embodiments and best mode of the invention are provided for the purpose of illustration only and not limitation—the invention being defined by the claims and equivalents thereof.

What is claimed is:

1. A container apparatus comprising:

(a) a container body adapted for receiving a beverage container therein, the container body having a top end defining an opening in the container body for receiving the beverage container and a base end opposite the top end; and (b) at least one flange positioned on an outer surface of the container body and having an opening formed therethrough to receive and engage a complementary fastener; and (c) a base panel attached to the container body proximate the base end of the container body, wherein a recess is formed in the base panel and a fastening member is positioned within the recess, the fastening member pivotably attached to the base panel whereby the fastening member can be pivoted in and out of the recess.

2. The apparatus according to claim 1, wherein the complementary fastener comprises a hook clasp, and further comprising a strap attached to the hook clasp.

3. The apparatus according to claim 1, further comprising the beverage container, wherein the beverage container comprises a cup comprised of at least one food-grade material.

4. The apparatus according to claim 3, wherein the at least one flange is positioned proximate the top end of the container body, and further wherein the cup comprises a substantially cylindrical cup body having a top end defining an opening, the cup further comprising an upper lip section formed proximate the top end of the cup body, the upper lip section including at least one projecting member extending outwardly from the cup body, the at least one projecting member resting on the at least one flange when the cup is positioned in the container body.

5. The apparatus according to claim 1, further comprising the beverage container, wherein the beverage container comprises a cup comprised of at least one material selected from the group consisting of acrylonitrile butadiene styrene, high-density polyethylene, polyetheretherketone, acrylic, and polypropylene.

6. The apparatus according to claim 1, further comprising a light assembly comprising a housing and at least one light emitting device contained within the housing, the housing releasably attached to the container body proximate the base end of the container body.

7. The apparatus according to claim 6, wherein the light emitting device comprises at least one selected from the group consisting of a flexible printed circuit board, a light emitting diode, and an illuminated fiber optic cable, and the container body is comprised of at least one material selected from the group consisting of methyl methacrylate, thermoplastic polyurethane, and polymethylmethacrylate.

8. The apparatus according to claim 6, wherein the container body is sized and shaped to receive the light assembly housing at the base end of the container body and frictionally engages the light assembly housing to releasably retain the light assembly housing within the container body.

9. The apparatus according to claim 6, wherein the container body is comprised of a transparent or translucent material, the container body and the light assembly housing are substantially cylindrical, and the at least one light emitting device comprises a plurality of outer lights positioned proximate an outer edge of the light assembly housing whereby the outer lights illuminate the container body when activated.

10. The apparatus according to claim 6, wherein the container body is comprised of a transparent or translucent material, the container body and the light assembly housing are substantially cylindrical, and the at least one light emitting device comprises a center light positioned proximate a center of the light assembly housing and adapted to emit a beam of light whereby the apparatus can be used as a handheld flashlight when the center light is activated.

11. A container apparatus comprising:

(a) a container body adapted for receiving a beverage container, the container body comprising a sidewall comprising an upper sidewall section and a lower sidewall section, the upper sidewall section having a diameter larger than the lower sidewall section, the upper sidewall section having a top edge defining a top opening in the container body for receiving the beverage container and the lower sidewall section having a bottom edge defining a bottom opening in the container body; and (b) a light assembly comprising a housing and at least one light emitting device contained within the housing, the light assembly housing sized and shaped to be received through the bottom opening of the container body, wherein an outer surface of the light assembly housing frictionally engages an interior surface of the lower sidewall section whereby the light assembly housing is releasably retained within the container body, and wherein a recess is formed in the light assembly housing and a fastening member is positioned within the recess and pivotably attached to the base, whereby the fastening member can be pivoted in and out of the recess.

12. The apparatus according to claim 11, further comprising at least one flange positioned on an outer surface of the upper sidewall section and having an opening to receive and engage a complementary fastener.

13. The apparatus according to claim 11, wherein the container body is comprised of a transparent or translucent material, and further wherein the upper sidewall section, the lower sidewall section, and the light assembly housing are substantially cylindrical, and the at least one light emitting device comprises a plurality of outer lights positioned proximate an outer edge of the light assembly housing whereby the outer lights illuminate the container body when activated, and a center light positioned proximate a center of the light assembly housing and adapted to emit a beam of light whereby the apparatus can be used as a handheld flashlight when the center light is activated.

14. A container apparatus comprising:

(a) a container body adapted for receiving a beverage container therein, the container body having a top end defining an opening in the container body for receiving the beverage container and a base end opposite the top end; and (b) a base panel attached to the container body proximate the base end of the container body, wherein a recess is formed in the base panel and a fastening member is positioned within the recess, the fastening member pivotably attached to the base panel whereby the fastening member can be pivoted in and out of the recess.

15. The apparatus according to claim 14, further comprising a light assembly comprising a housing and at least one light emitting device contained within the housing, the housing releasably attached to the container body proximate the base end of the container body.

16. The apparatus according to claim 15, wherein the light emitting device comprises at least one selected from the group consisting of a flexible printed circuit board, a light emitting diode, and an illuminated fiber optic cable, and the container body is comprised of at least one material selected from the group consisting of methyl methacrylate, thermoplastic polyurethane, and polymethylmethacrylate.

17. The apparatus according to claim 15, wherein the container body is sized and shaped to receive the light assembly housing at the base end of the container body and frictionally engages the light assembly housing to releasably retain the light assembly housing within the container body.

18. The apparatus according to claim 15, wherein the container body is comprised of a transparent or translucent material, the container body and the light assembly housing are substantially cylindrical, and the at least one light emitting device comprises a plurality of outer lights positioned proximate an outer edge of the light assembly housing whereby the outer lights illuminate the container body when activated.

19. The apparatus according to claim 15, wherein the container body is comprised of a transparent or translucent material, the container body and the light assembly housing are substantially cylindrical, and the at least one light emitting device comprises a center light positioned proximate a center of the light assembly housing and adapted to emit a beam of light whereby the apparatus can be used as a handheld flashlight when the center light is activated.

* * * * *